United States Patent [19]

Yamashita

[11] Patent Number: 4,893,469
[45] Date of Patent: Jan. 16, 1990

[54] STEAM AND COMBUSTION GAS ENGINE

[76] Inventor: Yasui Yamashita, 631 Park Ave., Hot Springs, Ark. 71901

[21] Appl. No.: 141,576

[22] Filed: Jan. 7, 1988

[51] Int. Cl.$^4$ ............................................. F01K 21/04
[52] U.S. Cl. ..................................... 60/39.54; 60/649; 60/670
[58] Field of Search .................... 60/674, 649, 39.53, 60/39.54, 39.55, 673, 670

[56] References Cited

U.S. PATENT DOCUMENTS

| | | | |
|---|---|---|---|
| 813,075 | 2/1906 | Baudin | 60/674 |
| 3,739,575 | 6/1973 | Falk | 60/39.54 X |
| 3,747,336 | 7/1973 | Dibelius | 60/39.55 X |
| 3,871,180 | 3/1975 | Swanson | 60/674 X |

Primary Examiner—Allen M. Ostrager
Attorney, Agent, or Firm—Richard C. Litman

[57] ABSTRACT

An engine utilizes a powdered biomass fuel that is ignited to heat water which is spray injected into a turbine section. The heated water converts into steam turning the turbine blades through its expansion. A combustion chamber is separate from a steam expansion chamber with heat being directed through communicating passageways.

7 Claims, 1 Drawing Sheet

U.S. Patent
Jan. 16, 1990
4,893,469
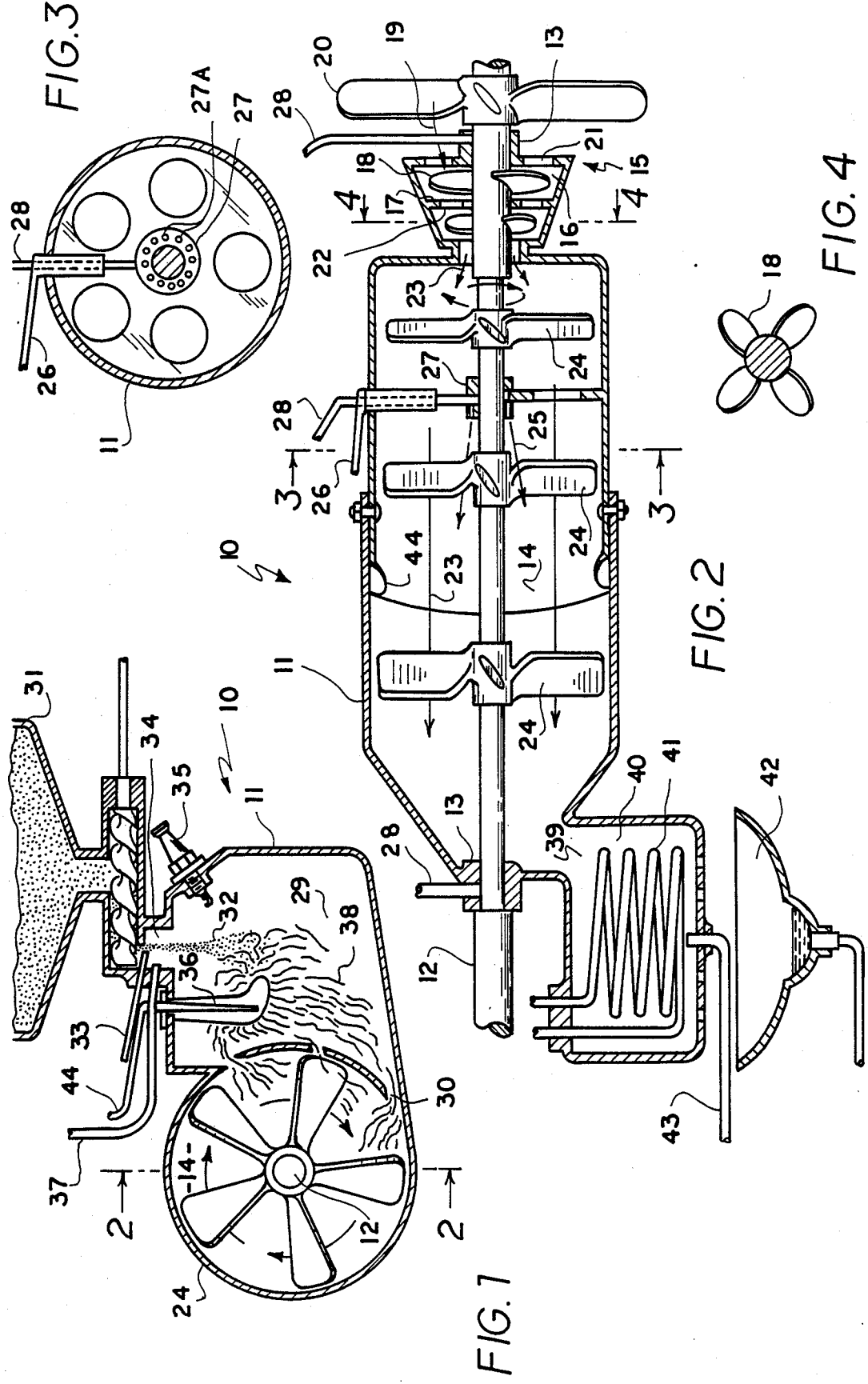

4,893,469

STEAM AND COMBUSTION GAS ENGINE

BACKGROUND OF THE INVENTION

1. Field of the Invention

This invention relates generally to combustion engines.

More particularly it relates to engines using gasoline substitutes for fuel.

2. Description of the Prior Art

As is well known, the increasing demand of fuel energy by modern mankind has necessitated the development of new fuels, and better engines in which the fuels are used. It is in this spirit that the applicant has developed in the recent past his powdered fuel (gasoline substitution), and on which he has obtained a U.S. Pat. No. 4,244,701. The applicant is aware that a yet greater efficiency in fuel energy may be obtained, when both the fuel and the engine are made particularly compatible for each other.

Accordingly, it is a principal object of the present invention to provide an engine that is designed especially for utilizing powdered fuel as a gasoline substitution, and which additionally needs only water as an operating power fuel.

Another object is to provide a $H_2O$ engine, which is of rotary type, in order to be small but powerful, and wherein the water is heated by the powdered fuel, so as to form a driving steam.

Yet another object is to provide a $H_2$ Engine, which is less complicated than a conventional reciprical piston engine, or a conventional rotary engine with sliding cam plate, so that it is less costly to purchase, easier to maintain, and less likely to break down.

Other objects are to provide a $H_2O$ Engine, which is simple in design, inexpensive to manufacture, rugged in construction, easy to use, and efficient in operation.

These, and other objects, will be readily evident, upon a study of the following specification, and the accompanying drawing, wherein:

BRIEF DESCRIPTION OF THE DRAWING

FIG. 1 is an end cross-sectional view of the invention;

FIG. 2 is a side cross-sectional view thereof taken on line 2—2 of FIG. 1;

FIG. 3 is a transverse cross-sectional view, taken on line 3—3 of FIG. 2, and

FIG. 4 is a transverse cross-sectional view, taken on line 4—4 of FIG. 2.

DESCRIPTION OF THE PREFERRED EMBODIMENT

Referring now to the drawing figures in greater detail, the reference numeral 10 represents a $H_2O$ engine, according to the present invention, wherein there is an engine case 11, having a drive shaft 12 journalled in bearings 13, and extending through a cylindrical reaction chamber 14 thereof. The case includes an air compressor unit 15 formed at one end thereof; the unit being conically tapered, and containing a row of progressively smaller chambers 16 shown by FIG. 4, therein, divided by a partition 17. An air impeller 18, in each chamber 16, is affixed on the drive shaft, so that exterior air, indicated by arrow 19, is pulled by an external impeller 20, mounted on the shaft, and is forced through air intake openings 21 on the endwall of the unit, and then through openings 22 in the partition, so as to progressively compress the air in the chambers, and finally force it into the reaction chamber, as shown at arrow 23.

In the reaction chamber, a plurality of turbine wheels 24 are affixed on the shaft; each progressive turbine wheel having wider vanes, as shown in FIG. 2. Water 25 is injected into the reaction chamber by means of a water intake pipe 26, connected to a hollow collar 27, through which the shaft 12 extends; the collar having a series of water spray holes 27a on one side thereof, as best illustrated in FIG. 3. The spray water is carried by the compressed air and the turbine wheels along the length of the reaction chamber. The collar opening, receiving the shaft, is lubricated similarly to the bearings 13, by means of oil supply tubes 28.

The case 11 also includes a combustion chamber 29 along a longitudinal side of the reaction chamber, and communicates therewith by means of a plurality of elongated slots 30.

An exterior fuel hopper 31 is mounted on top of the engine case, and serves to hold a supply of the powdered fuel 32, which is compounded from powdered wood charcoal, powdered hard coal, powdered Biomass (farm, forest, and garden residues, waste paper), gun powder, alcohol and water; and which is dispensed steadily from the hopper by means of a screw feed that is motor driven (not shown). A slideable gate 33 controls the dispensing volume at a discharge port, from where the powdered fuel drops through a throat 34, and into the combustion chamber. A spark plug 35 of an electric circuit (not shown) serves to ignite the powdered fuel initially in the combustion chamber, while a Hot Rod 36, heated by an electric circuit (not shown), serves as a perpetually continuous ignition while the engine is operating. A pipe 37 discharges a spray of alcohol into the throat 34, for mixing with the dropping powdered fuel.

As shown in FIG. 1, when the engine is running, the Hot Rod ignites the powdered fuel, creating a flame 38, that passes through the slots 30 and into the reaction chamber, thus heating the air and water moving therethrough, so as to form expanding steam, which rotates the turbine wheels with great force, and roates the dive shaft at great speed.

At a tapered end of the reaction chamber, the used steam passes through an opening 39, and into a condenser chamber 40 of the case, and where a cooling coil 41 condenses the steam into water, which together with carbon and other residue from the fire, flows down into a waste collection vessel 42, while the used air is exhausted out of an exhaust pipe 43. Such exhausted air is comparatively clean, due to being washed by the steam inside the engine, so that it does not pollute the atmosphere.

It is to be noted, that a venturi effect is accomplished inside the reaction chamber, by means of inward lip 44.

While various changes may be made in the detail construction, it is understood that such changes will be within the spirit and scope of the present invention, as is defined by the appended claims.

What I now claim is:

1. An internal combustion engine using a powdered biomass fuel to heat water into steam, including:
   an expansion chamber containing a drive shaft, turbine blades affixed to said drive shaft;
   a compression chamber disposed at a front end of said expansion chamber and having an air inlet, said compression chamber and said expansion chamber communicating through an aperture disposed between said expansion and compression chambers;

a combustion chamber laterally offset from said expansion chamber and communicating with said expansion chamber through one or more openings disposed between said expansion and combustion chambers;

supply and feed means delivering said powdered fuel into sid combustion chamber;

means to ignite said powdered biomass fuel within said combustion chamber;

means to spray water into said expansion chamber;

an exhaust chamber communicating with said expansion chamber and disposed at an end of said expansion chamber opposite said compression chamber; whereby ignition of said powdered biomass fuel heats said water in said expansion chamber, converting said water into steam, which expands and turns said turbine blades and drive shaft, providing power.

2. The internal combustion engine according to claim 1, wherein:

said drive shaft extends through said compression chamber and having compressor blades affixed thereto inside said compression chamber, and an external fan blade disposed on said drive shaft outside of said compression chamber adjacent said air inlet.

3. The internal combustion engine according to claim 1, wherein:

said exhaust chamber includes a cooling coil to convert said steam into water; and said exhaust chamber includes exhaust openings to allow liquid residue to drain into a collection vessel.

4. The internal combustion chamber according to claim 1, wherein:

said means to spray water into said expansion chamber includes a circumferential collar surrounding said drive shaft, said collar having multiple discharge apertures circumferentially disposed around said collar from which water is discharged, and said collar having means to feed said discharge apertures.

5. The internal combustion engine according to claim 1, wherein:

said means to feed said powdered fuel includes a rotating screw disposed between said supply of fuel and said combustion chamber.

6. The internal combustion engine according to claim 1, wherein:

said means to ignite said fuel includes a continuously heated metal rod disposed within said combustion chamber.

7. The internal combustion engine according to claim 1, wherein:

said fuel comprises a mixture of powdered charcoal, powdered coal, gun powder, alcohol, water and powdered biomass including farm, forest and garden residues and waste paper.

* * * * *